United States Patent [19]

Smyly, Sr.

[11] Patent Number: 5,133,149
[45] Date of Patent: Jul. 28, 1992

[54] CRUSTACEAN TRAP

[76] Inventor: George M. Smyly, Sr., 1903-B Carlton St., North Charleston, S.C. 29405

[21] Appl. No.: 587,086

[22] Filed: Sep. 24, 1990

Related U.S. Application Data

[63] Continuation-in-part of Ser. No. 355,750, May 22, 1989, abandoned.

[51] Int. Cl.⁵ .............................................. A01K 69/00
[52] U.S. Cl. ............................................. 43/100; 43/17
[58] Field of Search ............... 43/100, 102, 103, 104, 43/105, 62, 66, 17

[56] References Cited

U.S. PATENT DOCUMENTS 3,508,358  4/1970  Lee ................................. 43/17

Primary Examiner—Kurt Rowan

[57] ABSTRACT

A marine crustacean trap that is more particularly designed to entrap live crabs one at a time. A cage portion of the trap has an elastically closed gate and a bait well is secured within the cage. Also within the cage, trip cords are arranged such that the cords interfere with crustacean access to the bait well. A trip mechanism is secured upon the top of the cage and the mechanism has a releasably secured float maintained upon a support by having a gate open latch and a pivotal trip lever together locking onto the float. A crustacean pulling upon a trip cord causes the trip lever to rotate and unlock from the float. Now tension upon the gate open latch causes the float to rotate up and over a small float stop member of the support. As the float rotates the gate closes and the latch is released from the float permitting the float to ascend to a water surface. A ring encircling the trap hauling line is also linked with the float. Firm dry material placed within the workings of the trip mechanism will prevent triggering of the mechanism until the trap is submerged in water. A sport fisherman can cast, or throw, the trap into water and not have to be concerned about inadvertent triggering of the trip mechanism when the trap impacts with the surface of the water.

25 Claims, 6 Drawing Sheets

CRUSTACEAN TRAP

REFERENCES TO RELATED APPLICATIONS

This is a continuation-in-part of application Ser. No. 355,750 filed May 22, 1989, which is abandoned. The earlier filing date of this application is hereby claimed.

An application for a continuation of the above application has been submitted to the Commissioner of Patents and Trademarks, Washington, D.C. 20231. (The Serial Number of applicant's continuing patent application is not known at this time.)

BACKGROUND OF THE INVENTION

1. Field of the Invention

This invention relates generally to fishing for marine crustaceans and more particularly to entraping and landing a single live crustacean, preferably a crab, by fishing with a unique trap that is designed to be cast, or thrown, to the water; a signal float being released from the trap when a crustacean becomes entrapped thereby.

2. Prior Art

In my U.S. patent application, Ser. No. 355,750 for Marine Crab Trap which was filed May 22, 1989 and in my Continuation of the above application a very practical, useful and entertaining casting crab trap having a releasable signal float and a somewhat heavy time delayed tripping mechanism was disclosed. Although that casting crab trap having a releasable signal float and a somewhat heavy time delayed tripping mechanism is very practical, usable and entertaining, it requires a cage that is separated from the triggering mechanism. It also requires a sinker and a relatively heavy support platform whereupon the cage and trip mechanism are separately mounted.

SUMMARY OF THE INVENTION

The present invention is a non-buoyant cage having an inward opening elastically closed front gate having buoyant triggering mechanism components upon a top surface of the cage. In one embodiment of the invention, the cage has a permanently installed bait well having a hinged open/close flap located external of and at the underside of the cage. Another embodiment of the invention has a detachably secured bait well within the cage.

Triggering mechanism components are comprised of a releasable float, a float support, a float stop component of the float support, a trip lever pivotally secured within a slot arranged through the float support, a trip lever leverage component and trip cords.

A tensioned gate open latch is releasably hooked onto the float such that this latch together with the float stop and pivotal trip lever maintains the float upon the support member, the trip lever being locked onto the float. A crustacean attempting to feed at the bait well is forced to move, or pull upon, the trip lever leverage component, this leverage component having cord like members, or shaped members, which interfere with crustacean access to the bait well. Moving, or pulling upon the cord like, or shaped, members of the trip lever leverage component will rotate the trip lever unlocking the trip lever from the float. When the trip lever becomes unlocked from the float, tension upon the gate open latch will cause the float to rotate up and over the stop component of the float support. As the float is rotating the gate latch is released from the float permitting the gate to close and the float to ascend. A ring encircling the cage hauling line is flexibly linked with the float.

The tripping mechanism can be locked until the trap is submerged in water by wedging firm matter against the trip lever. This is accomplished by having a type of firm matter that loses all firmness upon becoming moist, dissolving, or, if frozen, by melting.

Accordingly, an object of the present invention is to provide a trap having a cage with buoyant triggering mechanism components centrally secured upon the top surface of the cage.

Another object of the present invention is the use of light weight materials in the construction of the trap.

Still another object of the present invention is to have a trap that is not at all complex and therefore easy to construct and inexpensive.

Another object of the present invention is to have a trap that will not be damaged if cast, or thrown, to the water.

Yet, another object of the present invention is to have a time delayed tripping mode as a feature of the trap tripping mechanism such that tripping the tripping mechanism can not occur until shortly after the trap is submerged in water.

Another object of the present invention is to have a small, easy to store trap.

Another object of the present invention is to have a fisherman experience the thrill of seeing a float "pop" to the surface of the water when a preferred single crab is entrapped within the cage of the trap.

Another object of the present invention is to have a trap that is easy to reset, or cock, and in fact, a trap that can be reset, or cocked, in approximately one second.

Another object of the present invention is to have a detachably secured bait well within the device, the bait well requiring bait only once per outing because lured crustaceans will seldom manage to eat any of the bait.

Another object of the present invention is to have an embodiment of the trap such that a bait well is a permanent component of the trap cage and has a open/close flap that is located external of the trap cage.

It is yet further an object of the present invention to have a trap that can be gently introduced into water should casting, or throwing, the same to the water be undesirable.

Finally, it is an object of the present invention to have a trap that can be cast to the water and recovered from the water by combining the same with a conventional fishing rod and reel.

BRIEF DESCRIPTION OF THE DRAWINGS

The aforementioned objects and advantages of the invention will be evident from the following description and accompanying drawings wherein like reference characters refer to like parts, and wherein.

DETAILED DESCRIPTION OF THE PREFERRED EMBODIMENTS

Figure 15:
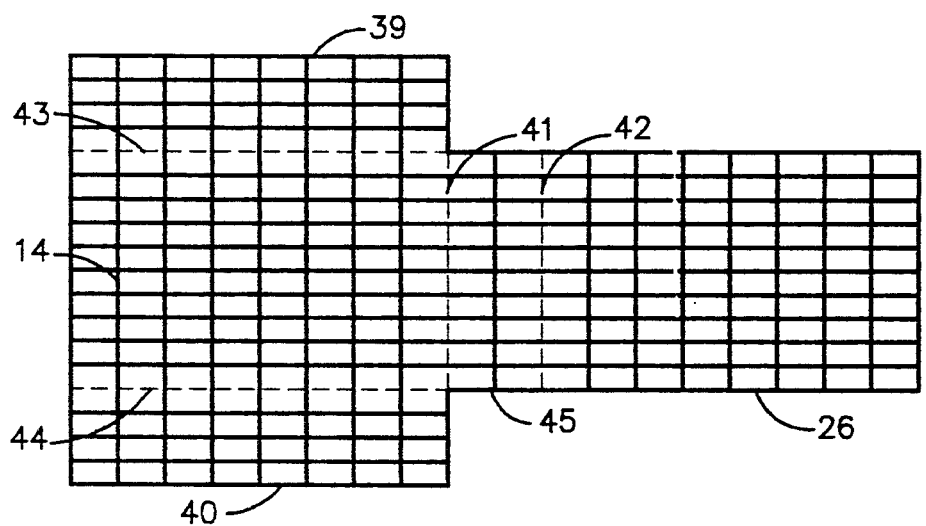
FIG. 15 is a plane top view of wire mesh cage material and shows dashed lines along which the wire mesh is to be bent, or folded.

Referring particularly to FIG. 15, shown is a cut-out section of preferred one inch by two inch conventional light gage galvanized wire mesh. A nonbuoyant cage having a top 14, side walls 39, 40, a back wall 45, a bottom 14, and having an opening at the hereinafter understood front end thereof, will be formed by bending the section of wire mesh along the dashed lines 41, 43, 44 at ninety degree angles away from the viewer and then making a ninety degree bend along the dashed line 42 toward the viewer.

Figure 13:
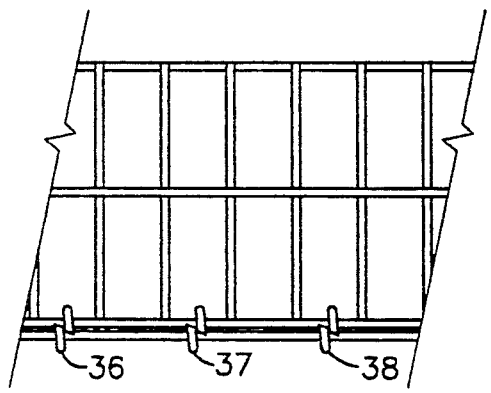
FIG. 13 is an enlarged segment view showing preferred pig rings being used to join edges of the cage.

FIG. 13 shows preferred tightly crimped conventional pig rings 36, 37, 38 being used to join the adjacent edges of the section of wire mesh after the section of wire mesh has been bent to form the cage as described. The mentioned opening at the front end of the cage will accommodate a hereinafter described spring-loaded and therefore elastically closed cage gate.

Figure 1:
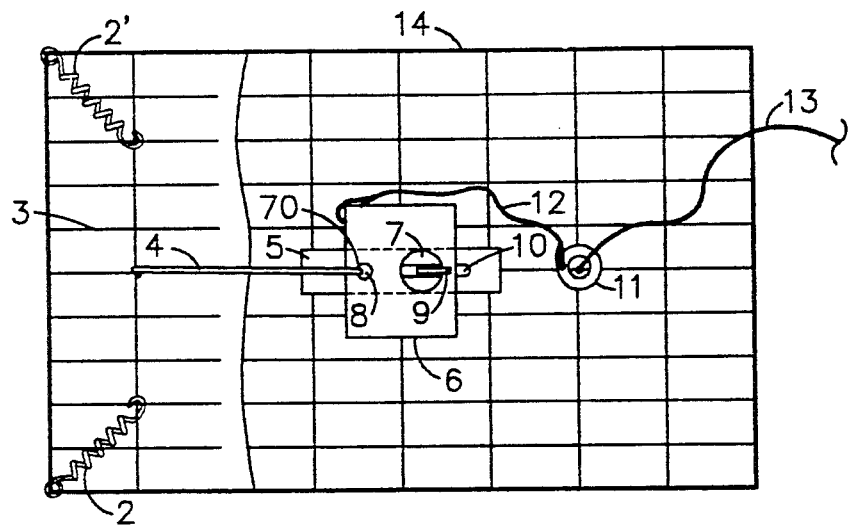
FIG. 1 is a partial top view of the trap and shows a cut-away portion of the top of the cage permitting a view of the cage gate.
Figure 3:
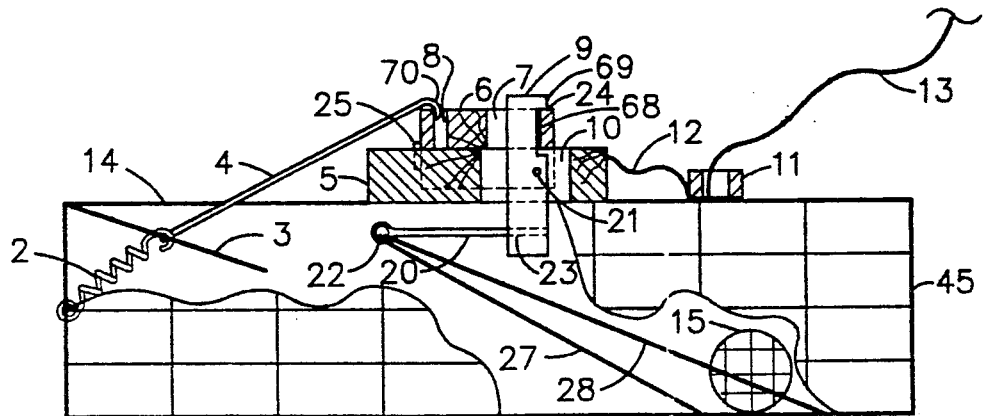
FIG. 3 is a partial sectional side view of the trap showing cut-away areas of the cage side wall.

Viewing FIG. 3, shown is a side view of the trap such that a cut-away portion of the cage provides an unobstructed view of an inward opening spring 2 loaded pivotal cage gate 3. FIG. 1 shows a top view of the trap having a cut-away portion of the wire mesh top 14 of the cage providing a view of the inward opened gate 3. The springs 2, 2' tend to elastically close the gate.

Gate stops are not necessary. However, a gate stop can be provided by simply bending a forward edge the wire mesh cage such that a closed gate will abut the bent edge thus provided.

Figure 12:
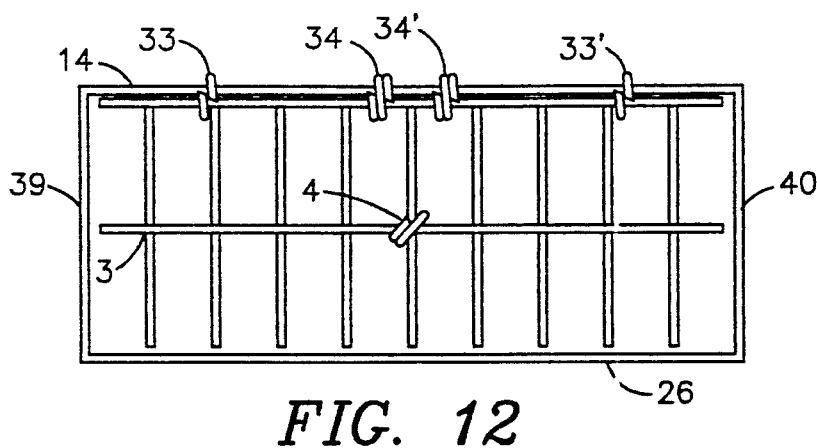
FIG. 12 is an enlarged partial front view showing the hinged cage gate.

FIG. 12 is a partial front view of the cage showing that the gate 3 is hinged at the top 14 forward edge of the cage by having preferred slightly crimped conventional pig rings 33, 33' securing the top edge of the gate 3 to the top forward edge of the cage. The wrap-around wires 34, 34' also secure the top edge of the gate 3 to the top forward edge of the cage and provide the trap with a more durable hinged cage gate. The wires 34, 34' are a loosely wound around the edges shown and do not prevent, or hinder, opening and closing the gate.

Figure 14:
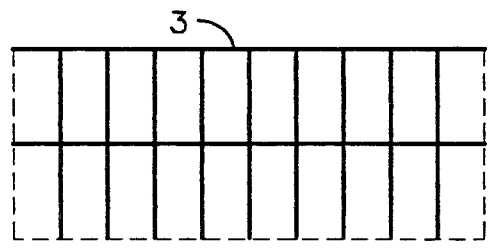
FIG. 14 is a plane view of the cage gate showing dashed lines representing nipped away portions of the mesh wire material of the gate.

FIG. 14 shows a preferred method of forming the cage gate from a section of wire mesh. The dashed lines represent nipped away lengths of the section of wire mesh. Removing these lengths of wire as described results in forming the gate 3 as best shown in FIG. 12.

Figure 17:
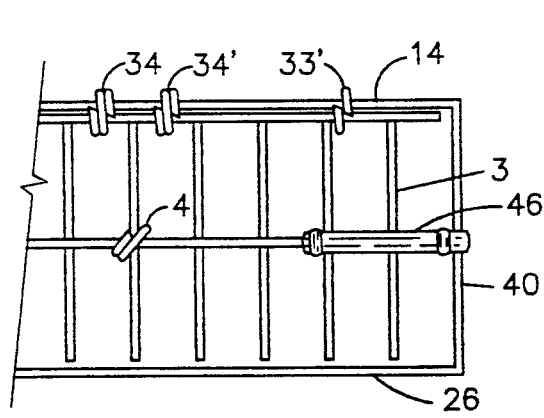
FIG. 17 is an enlarged partial front view of the cage gate and shows that rubber, rubber like, or elastic material can be used to provide an elastically closed cage gate.

FIG. 17 shows that rubber, rubber like, or suitable elastic material 45 can be substituted for the previously mentioned cage gate springs.

Figure 7:
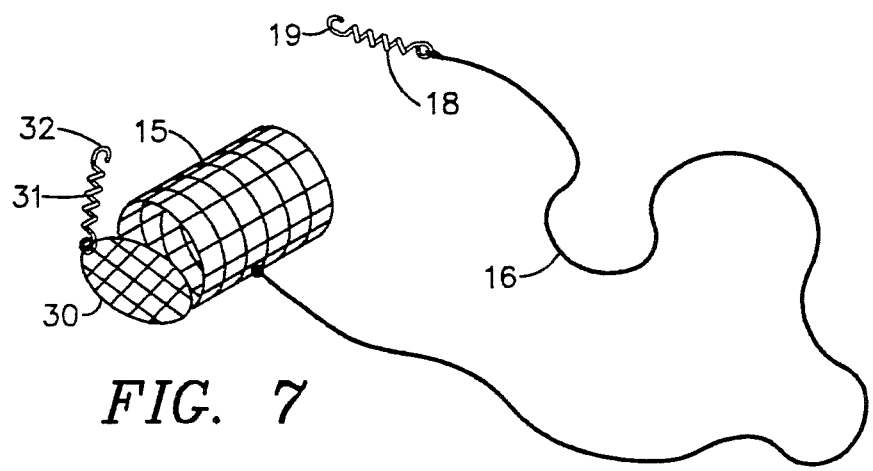
FIG. 7 is a perspective view of a preferred bait well.

Viewing FIG. 7, a preferred bait well 15 is shown. The bait well is constructed of conventional one quarter inch square mesh galvanized wire. A section of this wire is trimmed to the desired dimensions, rolled such that opposite edges become adjacent edges, and then the adjacent edges are sewn together using corrosion resistant fine wire. An open end of the bait well is permanently closed by wire sewing a circular shaped section of like kind wire mesh to the bait well such that the opening is covered by this section of wire mesh. Another circular shaped section of like kind wire mesh is hinged to the bait well such that this second section of wire mesh provides an open/close flap 30 for the second open end of the bait well. Hinging the open/close flap to the bait well is accomplished by loosely wire sewing a quadrant point of the flap to the rim of the bait well. A spring 31 having an end thereof forming a hook 32 is attached to the flap 30 such that the flap will be in a closed position when there is tension on the spring 31 and the hook is locked onto the bait well.

A bait well 15 attached cord 16 having the opposite end thereof attached to one end a spring 18 is also shown. This spring 18 also has the second end thereof forming a hook 19.

Figure 2:
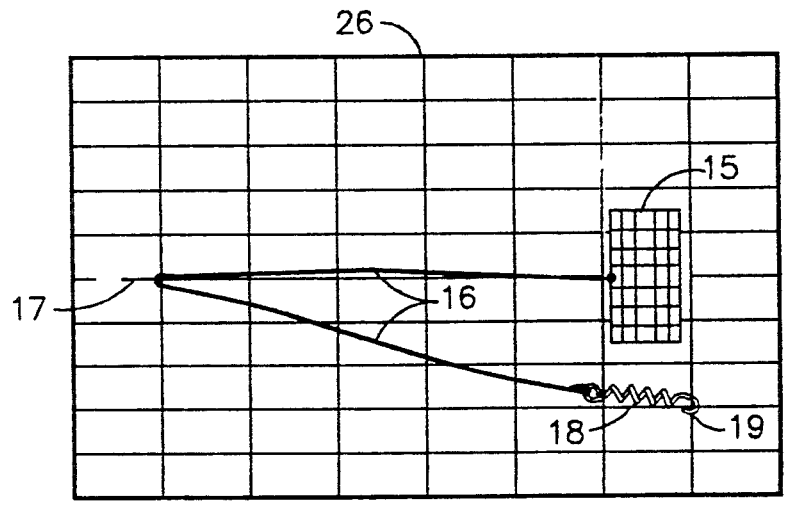
FIG. 2 is a top view showing the bottom of the cage portion of the trap and showing a bait well detachably secured thereto.

Viewing FIG. 2, the bait well is shown detachably secured upon the inner top surface of the bottom 26 of the cage by having the bait well attached cord 16 extending forward under the wire mesh bottom 26 of the cage, looping the preferred jut provided by the nipped wire 17, and then secured in place, under spring tension, by hooking, or locking, the hook 19 onto the wire mesh bottom 26 of the cage. If desired, a longer bait well attached cord will permit wrapping the cord around portions of the cage and hooking, or locking, the hook onto a surface of the cage other than the bottom of the cage.

Figure 21:
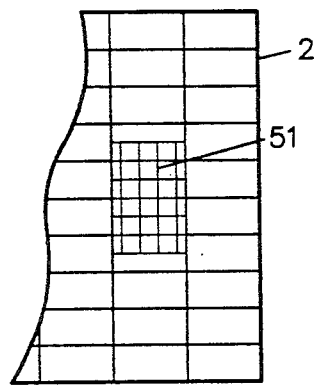
FIG. 21 is a plain partial top view of the bottom of the cage having a bait well permanently secured thereupon.
Figure 22:
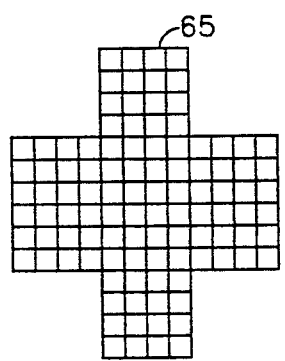
FIG. 22 is a plain view showing the shape of a section of wire mesh that can be bent, or folded, to form the permanently secured bait well.
Figure 23:
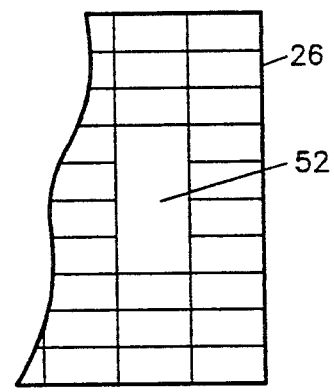
FIG. 23 is a partial top view of the bottom of the mesh wire cage showing an opening therein.
Figure 24:
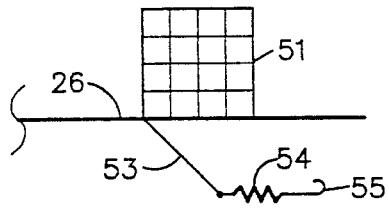
FIG. 24 is a plain partial side view of FIG. 21 showing the bait well open/close flap and the flap spring and hook.
Figure 25:
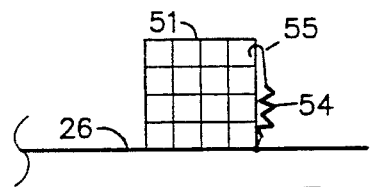
FIG. 25 is a view similar to FIG. 24 showing the bait well open/close flap in the closed position.
Figure 26:
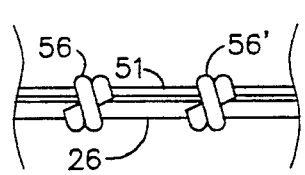
FIG. 26 is a partial view showing preferred pig rings being used to fasten the permanently secured bait well to the bottom of the cage.
Figure 27:
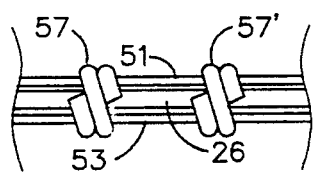
FIG. 27 is a view similar to FIG. 26 showing preferred pig rings also being used to fasten and hinge the bait well open/close flap to the bottom of the cage.

Viewing FIG. 21, a preferred second embodiment of a bait well 51 is partially shown such that the bait well 51 is permanently secured over the opening 52 of FIG. 23. The opening 52 is provided by nipping away sections of the wire mesh bottom 26 of the cage. This bait well 51 is preferably rectangular shaped and is formed by bending, or folding, the cut-out section of wire mesh shown laid out in FIG. 22. Adjacent edges of the formed bait well are preferably wire sewn together using corrosion resistant fine wire. FIG. 24 shows the bait well 51 having an open/close flap 53 which is external of the cage, preferably below the cage, and having an attached spring 54 and spring hook 55. FIG. 25 shows how the open/close flap can be secured in the closed position by hooking the spring hook 55 at a convenient location upon the permanently secured bait well 51. It should be noted that the openings in the wire mesh cage are sufficiently large to permit fingers to reach into the cage. FIG. 26 again shows preferred pig rings 56, 56' being used to fasten an edge of the bait well 51 to a transverse wire member of the bottom 26 of the cage. FIG. 27 shows preferred pig rings 57, 57' being used to both fasten and hinge the open/close flap 53 to a transverse wire member of the bottom 26 of the cage. Also shown is another edge of the bait well 51 permanently fastened to a transverse wire member of the bottom of the cage 26.

Without the above described detachably secured bait well, or the above described permanently attached bait well that can receive bait through an opening external of the cage enclosure, baiting this device would indeed prove to be a difficult and unpleasant task.

Viewing FIGS. 1, 3-6, and 16, a hauling line 13 is shown attached at a preferred location at the top of the cage.

Figure 8:
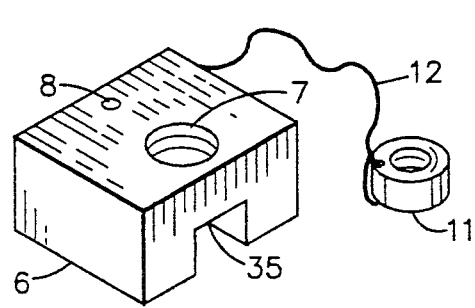
FIG. 8 is a perspective view of the float and the buoyant ring linked to the float.

Viewing FIG. 8, a preferred float 6 is shown having a longitudinally cut lower channel 35 along the underside thereof. Longitudinally spaced-apart first 8 and second 7 apertures are vertically arranged through the top surface of the float such that the apertures terminate within the lower channel thereof.

Figure 9:
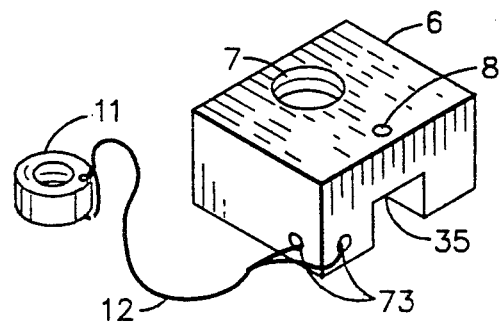
FIG. 9 is a rotated view of FIG. 8.

As best shown in the rotated view, FIG. 9 of FIG. 8, a preferred buoyant ring, or ring like device, is shown having a flexible link 12 attached thereto, the opposite end of the link being attached to the float 6.

Preferably, a hole 73 drilled through a corner of the float provides a tie point for the link 12. A drill hole through the ring 11 provides a second tie point for the link.

Viewing FIGS. 1, 3-6, and 16, the ring 11 is shown encircling the hauling line 13 such that the ring 11 is loosely, slidingly captured along the hauling line 13. Via the ring 11 encircling the hauling line 13, the float 6, buoyant ring, and link 12 can together ascend to a water surface and yet remain slidingly captured along the hauling line 13. Recovering the trap from the water by pulling upon the hauling line will result in having the float, link and ring conveniently returning to a location near the top of the recovered trap.

Preferably, the float and ring are constructed of light dry white pine wood and the float and ring are made waterproof by dipping each in hot melted wax.

Figure 19:
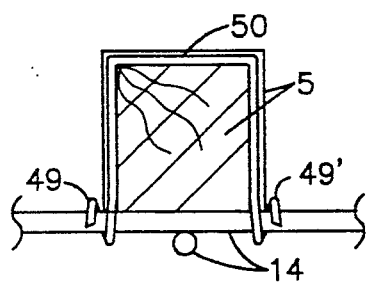
FIG. 19 is a sectional view taken along the line 19—19 of FIG. 20.

Viewing FIGS. 1, 3-6, and 16, an elongated buoyant support 5 is shown longitudinally medially positioned upon the top 14 of the cage. FIG. 19, taken along the line 19—19 of FIG. 20, and FIG. 20 together show a preferred method for attaching the support 5 upon the top 14 of the cage. A length of corrosion resistant tie wire 50 is partially wrapped around the support 5, the ends 49, 49' of the tie wire being tightly twisted about a transverse wire member of the top of the cage. The support 5 has an upper surface transverse groove and vertical side grooves located near the forward end thereof, the grooves providing a seat for the tie wire 50. In a like manner a rear end portion of the support is also attached to the top of the cage.

Figure 18:
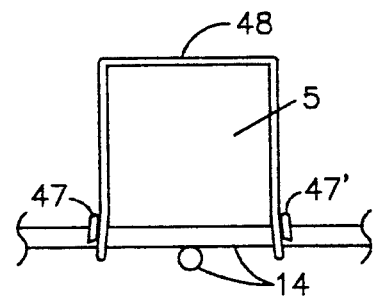
FIG. 18 can be considered as either a front or rear view of the support member tie wired to a top transverse cage wire.
Figure 20:
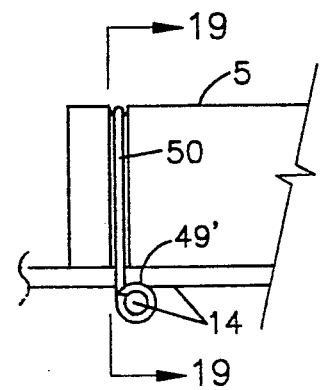
FIG. 20 is an enlarged partial side view of the support member shown tie wired upon the top of the cage.

Alternately, FIG. 18 shows a length of tie wire 48 securing a non-grooved support 5 upon the top of the cage by tightly wrapping the wire 48 about the support 5 and then tightly twisting the ends 47, 47' of the wire about a transverse wire member of the cage. Also, in a like manner a rear end portion of the non-grooved support is attached to the top of the cage. For clarity in the drawings, only FIGS. 18-20 show the tie wires 48, 50 being used to attach the support member 5 upon the top of the cage.

Preferably, the buoyant support is also constructed of light white pine wood and is made waterproof by also dipping the same in hot melted wax.

Figure 11:
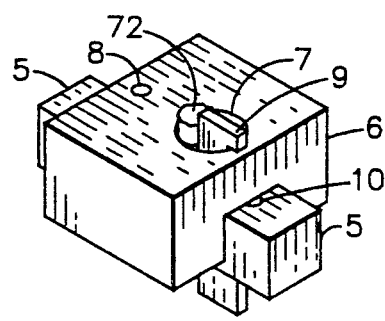
FIG. 11 is a perspective view of the float resting upon the support member and also shown is the firm matter preventing possible rotation of the trip lever.
Figure 16:
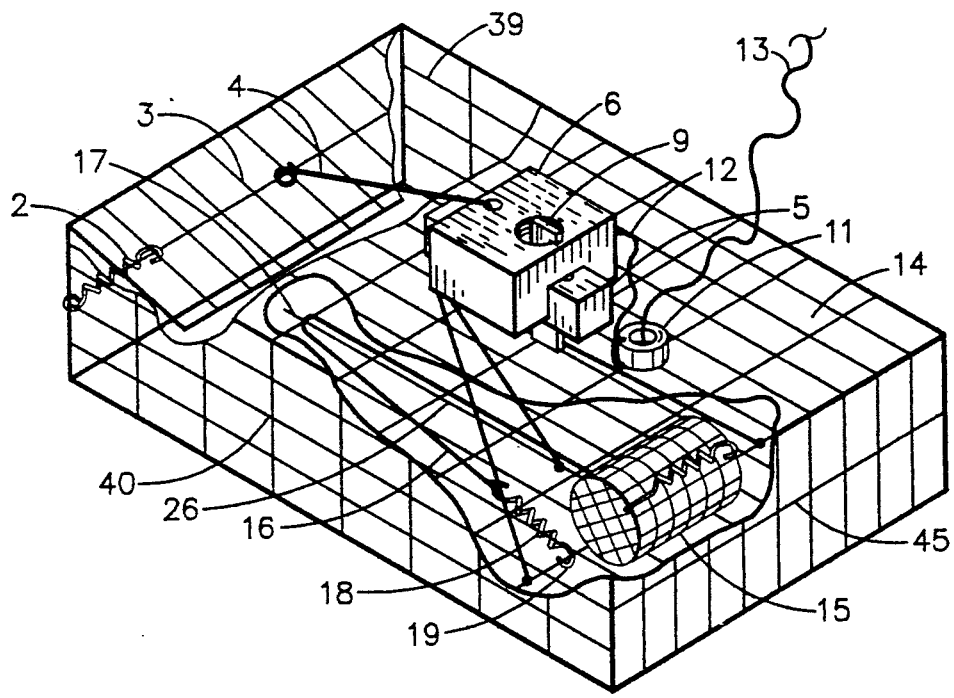
FIG. 16 is a perspective view of the overall trap and shows cut away portions of the cage.

As best shown in FIGS. 11 and 16, the float 6 is shown resting, or manually positioned, upon the elongated support 5 such that the support 5 is partially within the lower channel of the float 6.

Figure 10:
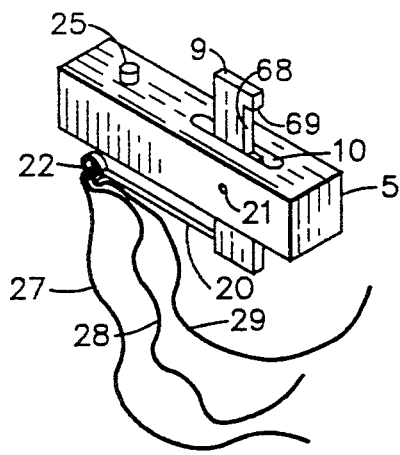
FIG. 10 is a perspective view of the preferred buoyant support member together with the pivotal trip lever, the stop member, the leverage rod, and the trip cords.

As best shown in FIG. 10, the elongated support 5 is shown having a slightly protruding float stop 25 attached upon an upper near forward surface area thereof. Preferably the stop 25 is a dowel like device that has been forcefully driven into a pre-drilled pilot hole vertically arranged through the top surface of the support 5. FIG. 3 shows a forward surface area above the lower channel of the float abutting the float stop 25.

Again viewing FIG. 10, an elongated slot 10 vertically arranged through a medial length of the support 5 is shown located longitudinally rearward of the float stop 25.

Figure 4:
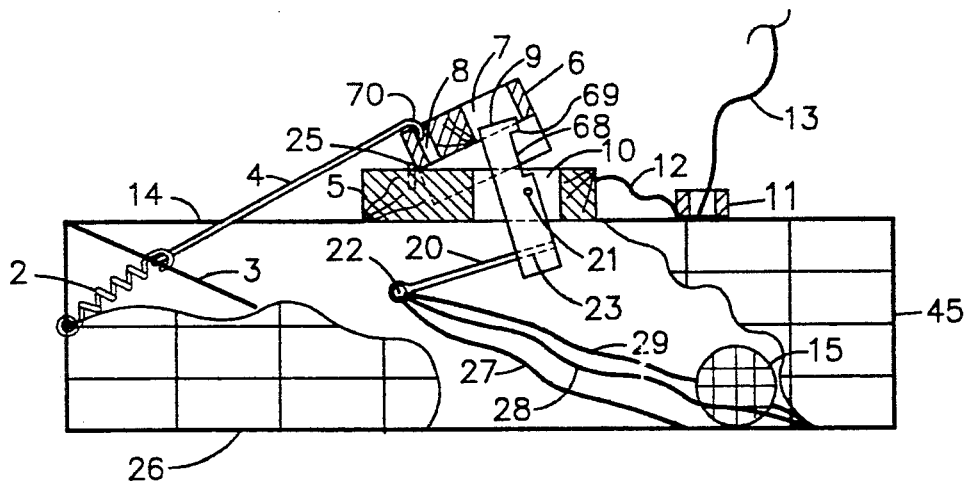
FIG. 4 is a view similar to FIG. 3 and shows the action of tripping mechanism components shortly after triggering has occurred.
Figure 5:
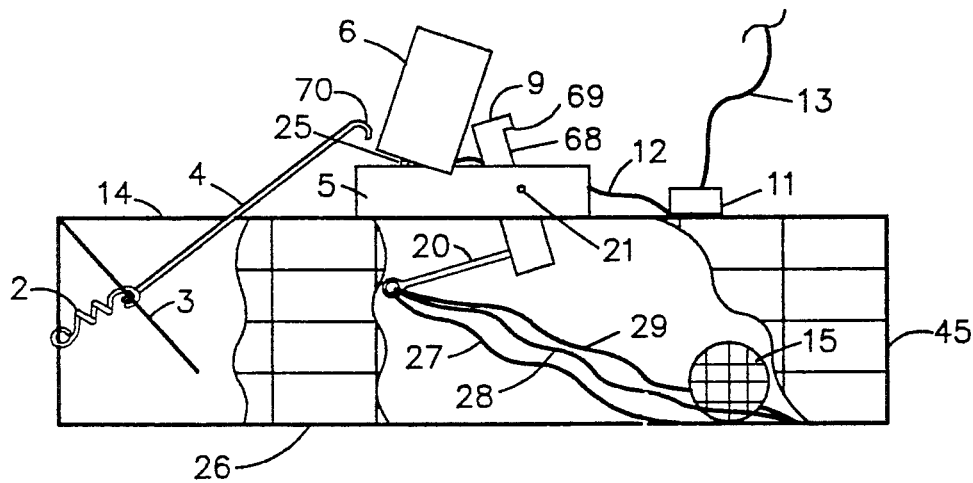
FIG. 5 is a partial side view of the trap and shows yet further action of components of the tripping mechanism after triggering has occured.
Figure 6:
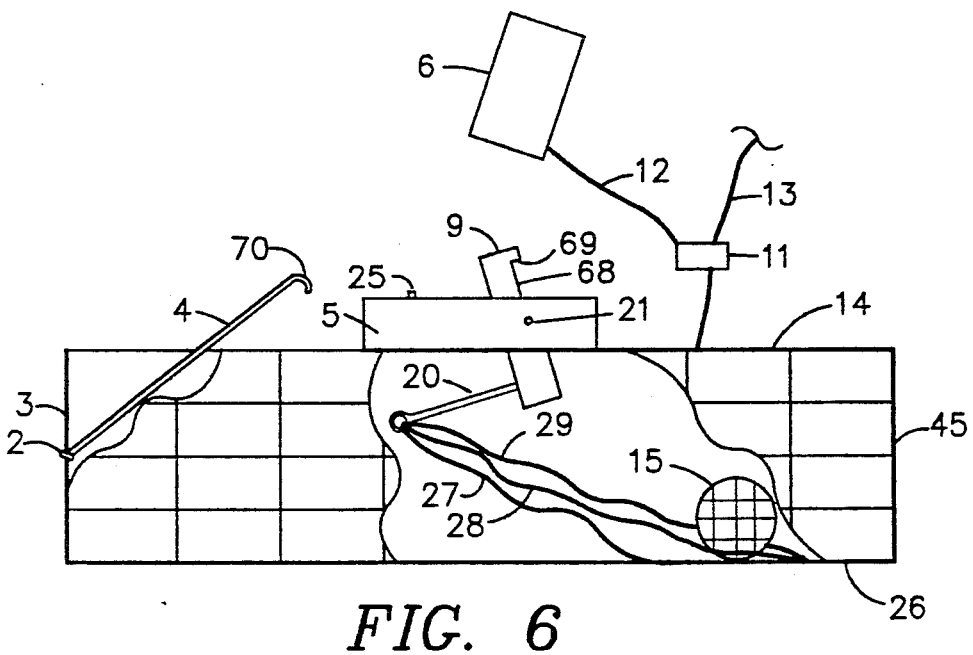
FIG. 6 is a view similar to FIG. 5 and shows the float depicted as ascending to a water surface.

Viewing FIGS. 3, 4 and 10, a trip lever 9 is shown secured upon a fulcrum, the trip lever 9 having a pivot point within the elongated slot 10 of the support 5. The fulcrum is a pin 21 driven transversely through the support 5 and disposed through the trip lever 9, the trip lever having a small transversely arranged pin hole drilled therethrough for receiving the pin 21.

FIG. 3 shows a lower portion of the trip lever 9 protruding downward from within the slot 10 until it is slightly within the cage. Viewing FIGS. 3, 4, 5 and 6, a preferred notched 68 upper portion of the trip lever 9 is shown disposed through the second aperture 7 vertically arranged through the top surface of the float 6. As best shown in FIG. 3, an upper lip 69 is formed by the notched upper portion of the trip lever such that the lip is locking onto a top surface area 24 of the float adjacent to and at the rear quadrant of the second aperture 7. As best shown in FIGS. 3 and 12, an elongated gate latch 4 has an end thereof forming a hook 70. The gate latch 4 maintains the gate 3 in an inward open position by placing the distal end of the latch hook against an inside surface area of the first aperture 8 vertically arranged through the top surface of the float 6. Forward and rotational movements of the float 6 upon the support 5 are prevented by the mentioned forward surface area of the float 6 abutting the slightly protruding float stop 25 while the lip of the trip lever is locked onto the top surface area of the float adjacent to the rearmost quadrant of the second aperture 7 of the float 6. Transverse movement of the float 6 is prevented by having the support 5 partially within the channel of the float 6. An elongated leverage rod 20 is shown having an end thereof perpendicularly attached to the lower portion of the trip lever 9. Preferably, this is a corrosion resistant wire rod that is attached to the lever by being forcefully inserted into a pre-drilled pilot hole 23 horizontally arranged through the lower portion of the trip lever. The distal forward directed second end of the leverage rod 20 forms an eye 22 wherein ends of preferred trip cords 27, 28, 29 are attached. The opposite ends of the trip cords are attached to the bottom of the cage such that the cords interfere with lured crustacean access to the bait well 15.

Figure 28:
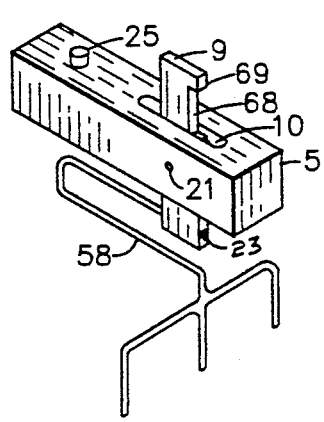
FIG. 28 is a perspective view of the float support member showing a type of trip lever leverage member that can be used to block crustacean access to a bait well.

Viewing FIG. 28, a trip lever 9 leverage device 58 is shown such that this bent, curved and forked device 58 is rigid, or only slightly flexible, and can be substituted for the leverage rod 20 and trip cords 27, 28, 29 with shows in FIGS. 4, 5, 6 and 10. As shown and previously described for the leverage rod 20, the trip lever leverage device 58 is fixedly attached to the trip lever 9 by having an end thereof forcefully inserted into a pre-drilled pilot hole 23 horizontally arranged through the lower portion of the trip lever 9. When substituted for the leverage rod 20 and trip cords 27, 28, 29, the trip lever leverage device 58 is interferring with lured crustacean access to the bait well.

Figure 29:
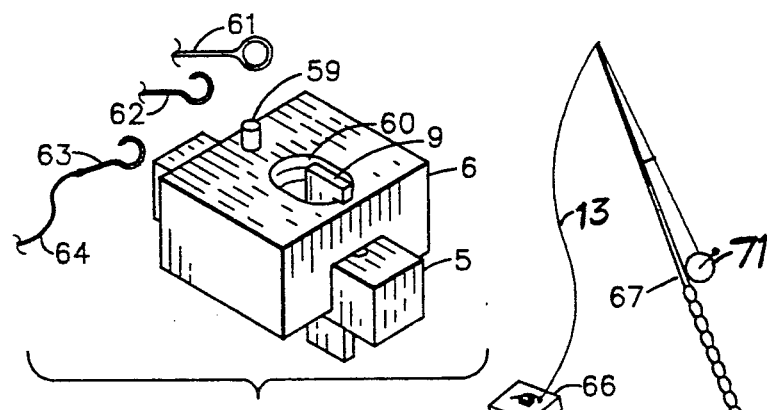
FIG. 29 is a perspective view of the float having an oblong instead of circular aperture for the leverage rod and a protrusion whereupon types of cage gate latches can be releasably attached.

Viewing FIG. 29, a preferred second embodiment of the float is shown. An oblong aperture 60 is shown accommodating the trip lever 9 and a protrusion 59 is shown such that types of cage gate latches 61, 62, 63 can be releasably attached to the protrusion 59, these types of cage gate latched being singularly substituted for the cage gate latch previously referred to in this specification. The hook of either latch 62 or 63 can be releasably attached to the protrusion 59. The ring of latch 61 can be releasably attached to the protrusion 59. All type latches, using latch 63 as an example, can have flexible cord or wire material 64 attached thereto and extending attached to the elastically closed cage gate of this invention.

Again viewing FIG. 3, an obvious torque force is applied to the float 6. This torque force is existing upon the float 6 when tension upon the gate latch 4 is maintaining the spring return, or elastically closed, cage gate 3 in an open position. Now viewing FIGS. 3-6, the float 6 will rotate up and over the float stop 25 when a crustacean, pulling upon any of the trip cords 28, 28, 29, causes the leverage rod 20 to move rotating the trip lever 9 and thus causing the trip lever lip to disengage from the top surface area of the float 6. The distal end of the gate latch, releasably locked onto the float via the mentioned hook, will also disengage from the inside surface area of the first aperture 8 of the float 6 as the float 6 is rotating thus permitting the float 6, the buoyant ring 11, and the link 12 to ascend to a water surface thereby providing a visual signal that the cage gate 3 is closed.

Viewing FIG. 11, a type of matter existing in a firm state and being inserted within the second aperature 7 of the float 6 such that the matter 72 is wedged between an inner surface area of the second aperture 7 and a forward surface area of the upper portion of the trip lever 9 will temporarily lock the tripping mechanism by delaying the possible rotation of the trip lever 7 until the firm state of the matter is changed as the matter dissolves, melts, becomes wet, or generally, when the type matter chosen looses firmness when submerged in water with the trap. After the understood wedged in place firm matter is no longer existing in a firm state the trip lever will be potentially free to rotate should pulling upon a trip cord occur.

Ice, salt, sugar, bread, especially toasted bread and stable bread, and most crispy cereals are among the more common and accessible types of matter that can be used to temporarily lock the triggering mechanism of this trap. However, a chunky type of dry dog food is the preferred type of firm matter to be used to temporarily lock the triggering mechanism of the trap.

It is mentioned at this time that the trap thus far described can impact with the surface of water and yet remain in a "cocked" mode, or in a non-tripping mode, until the trap is resting in an upright position upon the water's bed. Buoyancy of the float, the support, and the ring insure that the trap will always sink in an upright position. Also, the preferred buoyant ring will tend to keep the hauling line from becoming entangled with a submerged trap by maintaining the hauling line somewhat above the trap.

Figure 30:
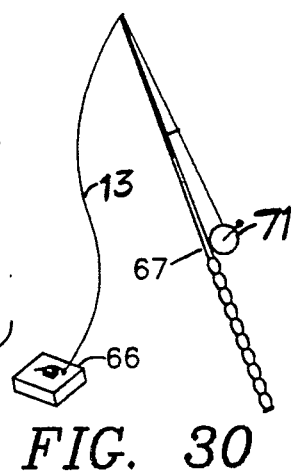
FIG. 30 is a scaled down plain view of a conventional rod and reel being used in combination with the invention, the invention being depicted in a scaled down perspective view.

Viewing FIG. 30, a conventional rod and reel 67 is shown in combination with the trap 66. As shown, the hauling line 13 which is fixedly attached to the case 66 has the other end thereof attached to the reel member 71 of the rod and reel 67 so that the trap 66 is used in combination with the rod and reel 67. Using a rod and reel to cast and recover the trap from the water is a convenient method of managing the trap should simply tossing the trap to the water be undesirable.

Several teachings concerning my invention should be mentioned. A person skilled in the art could easily construct like kind traps having a number of shapes and having more than one elastically closed cage gate. A trip lever that is "L" shaped, or that has a jutting member for locking onto the float, can be substituted for the trip lever having a notch provided lip method of locking onto the float. Numerous suitably shaped flexible and rigid devices could interfere with crustacean access to the bait well and thus be substituted for the trip lever leverage devices disclosed in this specification. Numerous conventional types of plastic material could be used in the construction of this invention.

"The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto."

I claim:

1. A marine crustacean trap more particularly intended for entraping one crab at a time comprising:
   a) a cage having a bottom, a top, side walls, a back wall, an elastically closed front gate, and a hauling line fixedly attached thereto;
   b) a detachably secured bait well within the cage and having an open/close flap, a cord being tied to the bait well and looping a nipped portion of the cage, the other end of the cord being tied to a spring, an opposite end of the spring forming a hook, the hook being attached to a portion of the cage;
   c) an elongated support being longitudinally medially positioned and fixedly attached upon the top of the cage, a protruding stop being fixedly attached upon a top surface area of the support, an elongated slot being vertically arranged through a medial length of the support;
   d) a float having a longitudinally arranged lower channel and first and second longitudinally spaced-apart apertures vertically arranged through the top surface thereof, the float being positioned upon the support, the support being partially within the channel of the float, a forward edge of the float abutting the protruding stop upon support;
   e) a trip lever disposed through the slot of the support and the second aperture of the float, the trip lever having a pivot point within the slot of the support, a lower portion of the trip lever extending within the cage, a notched upper portion of the trip lever providing a lip that releasably locks onto a top surface area of the float adjacent the rearmost quadrant of the second aperture of the float;
   f) an elongated gate latch having a free end thereof forming a hook, the hook releasably locking into the first aperture of the float, the gate latch maintaining the elastically closed gate in an open position;
   g) an elongated leverage rod having an end thereof perpendicularly fixedly attached at the lower portion of the trip lever and having a distal second end thereof forming an eye wherein are attached ends of trip cords, opposite ends of the trip cords being attached to the bottom of the cage, the trip cords interfering with lured crustacean access to the bait well; and
   h) a ring encircling the hauling line and having a flexible link fixedly attached thereto, the link having an opposite end fixedly attached to the float.

2. The marine crustacean trap more particularly intended for entraping one crab at a time of claim 1, wherein matter existing in a firm state is inserted within the second aperture of the float, the matter being wedged between an inner surface area of the second aperture and a surface area of the trip lever, the inserted matter preventing pivotation of the trip lever until the trap is submerged in water, the matter no longer existing in a firm state moments after becoming submerged in water.

3. The marine crustacean trap more particularly intended for entraping one crab at a time of claim 2, wherein the matter is frozen and upon thawing is no longer in a firm state.

4. The marine crustacean trap more particularly intended for entraping one crab at a time of claim 2, wherein the matter dissolves in water.

5. The marine crustacean trap more particularly intended for entraping one crab at a time of claim 1, wherein the hauling line which is fixedly attached to the cage has the other end thereof attached to a reel member of a conventional rod and reel so that the trap is used in combination with rod and reel.

6. A marine crustacean trap more particularly intended for entraping one crab at a time comprising:
   a) a cage having a bottom, a top, side walls, a back wall, an elastically closed gate, and a hauling line fixedly attached thereto;
   b) a bait well fixedly attached within the cage and having an open/close flap external of the cage;
   c) a support fixedly attached upon the top of the cage, the support having a stop fixedly attached upon a top surface thereof and an elongated slot vertically arranged through a medial length thereof;
   c) a float having a channel along a bottom surface thereof and having first and second longitudinally spaced-apart apertures vertically arranged through a top surface thereof, the float being placed upon the support such that the support is partially within the channel of the float, a frontal surface area of the float abutting the stop upon the support;
   d) a trip lever disposed through the slot of the support and the second aperture of the float, the trip lever having a pivot point within the slot of the support, a lower portion of the trip lever extending within the cage, an upper portion of the trip lever providing a lip that releasably locks onto a top surface area of the float adjacent the rearmost quadrant of the second aperture of the float;
   e) a gate latch having a free end forming a hook, the hook releasably locking into the first aperture of the float, the gate latch maintaining the elastically closed gate in an open position;
   f) a leverage rod having an end fixedly attached at the lower portion of the trip lever and having a distal second end thereof forming an eye wherein ends of trip cords are tied, opposite ends of the trip cords being tied to the bottom of the cage, the trip cords interfering with lured crustacean access to the bait well; and
   g) a ring encircling the hauling line, the ring having a link fixedly attached thereto, the link having an opposite end fixedly attached to the float.

7. The marine crustacean trap more particularly intended for entraping one crab at a time of claim 6, wherein matter existing in a firm state is inserted within the second aperture of the float, the matter being wedged between an inner surface area of the second aperture and a surface area of the trip lever, the inserted matter preventing pivotation of the trip lever until the trap is submerged in water, the matter no longer existing in a firm state moments after becoming submerged in water.

8. The marine crustacean trap more particularly intended for entraping one crab at a time of claim 7, wherein the matter is frozen and upon thawing is no longer in a firm state.

9. The marine crustacean trap more particularly intended for entraping one crab at a time of claim 7, wherein the matter dissolves in water.

10. The marine crustacean trap more particularly intended for entraping one crab at a time of claim 6, wherein the hauling line which is fixedly attached to the cage has the other end thereof attached to a reel member of a conventional rod and reel so that the trap is used in combination with the rod and reel.

11. A marine crustacean trap comprising:
a) a cage;
b) a bait well within the cage and having an external open/close flap external of the cage;
c) a float having a channel along the bottom surface thereof and longitudinally spaced-apart first and second apertures vertically arranged through a top surface thereof;
d) a support fixedly attached upon a top surface of the cage, the support having a slot vertically arranged through a medial length thereof and a fixedly attached stop thereupon;
e) a lever having a pivot point within the slot of the support, a portion of the lever protruding within the cage, an upper portion of the lever being disposed through the second aperture of the float, an upper lip of the lever locking onto a top surface area of the float;
f) a gate latch maintaining an elastically closed gate of the cage in an open position by hooking into the first aperture of the float;
g) a rod having an end fixedly attached to the lower portion of the lever and having a distal second end thereof forming an eye wherein are attached ends of trip cords, opposite ends of the trip cords being secured to a bottom of the cage, the trip cords interfering with lured crustacean access to the bait well; and
h) a ring encircling a hauling line, the hauling line being fixedly attached to the cage, the ring having a link fixedly attached thereto, the link having an opposite end fixedly attached to the float.

12. the marine crustacean trap of claim 11, wherein matter is inserted within the second aperture of the float, a firm state of the matter delaying rotation of the lever until the firm state of the matter is changed by submerging the trap in water.

13. The marine crustacean trap of claim 12, wherein the matter is frozen and upon thawing is no longer in a firm state.

14. The marine crustacean trap of claim 12, wherein the matter dissolves in water.

15. The marine crustacean trap of claim 11, wherein the hauling line which is fixedly attached to the cage has the other end thereof attached to a reel member of a conventional rod and reel so that the trap is used in combination with the rod and reel.

16. A marine crustacean trap comprising:
a) a cage;
b) a bait well within the cage;
c) a float having a protrusion upon the top surface thereof and an aperture vertically arranged through the top surface thereof;
d) a support fixedly attached upon a top surface of the cage, the support having a slot vertically arranged through a medial length thereof and a fixedly attached stop thereupon;
e) a lever having a pivot point within the slot of the support, a portion of the lever protruding within the cage, an upper portion of the lever being disposed through the aperture of the float and locking onto a top surface area of the float;
f) a gate latch maintaining an elastically closed gate of the cage in an open position by releasably locking onto the protrusion of the float;
g) a trip lever leverage device having an end fixedly attached to the lower portion of the lever, the leverage device interfering with lured crustacean access to the bait well; and
h) a ring encircling a hauling line, the hauling line being fixedly attached to the cage, the ring having a link fixedly attached thereto, the link having an opposite end fixedly attached to the float.

17. The marine crustacean trap of claim 16, wherein matter is inserted within the second aperture of the float, a firm state of the matter delaying rotation of the lever until the firm state of the matter is changed by submerging the trap in water.

18. The marine crustacean trap of claim 17, wherein the matter is frozen and upon thawing is no longer in a firm state.

19. The marine crustacean trap of claim 17, wherein the matter dissolves in water.

20. The marine crustacean trap of claim 16, wherein the hauling line which is fixedly attached to the cage has the other end thereof attached to a reel member of a conventional rod and reel so that the trap is used in combination with the rod and reel.

21. A marine crustacean trap comprising:
a) a cage;
b) a bait well within the cage;
c) a float having an aperture through the top surface thereof;
d) a support fixedly attached upon a top surface of the cage, the support having a slot through a length thereof and a fixedly attached float stop thereupon;
e) a trip lever having a pivot point within the slot of the support, a lower portion of the trip lever protruding within the cage, an upper portion of the trip lever being disposed through the aperture of the float and locking onto a top surface area of the float;
f) means for having a gate latch releasably locking onto the float, the gate latch maintaining an elastically closed gate of the cage in an open position;
g) means for having a leverage device fixedly attached to the lower portion of the trip lever, the leverage device interfering with lured crustacean access to the bait well: and
h) a ring like device encircling a hauling line, the hauling line being fixedly attached to the cage, the ring like device having a link fixedly attached thereto, the link having an opposite end fixedly attached to the float.

22. The marine crustacean trap of claim 21, wherein the hauling line which is fixedly attached to the cage has the other end thereof attached to a reel member of a conventional rod and reel so that the trap is used in combination with the rod and reel.

23. The marine crustacean trap of claim 21, wherein matter is inserted within the aperture of the float, a firm state of the matter delaying rotation of the trip lever until the firm state of the matter is changed by submerging the trap in water.

24. The marine crustacean trap of claim 23, wherein the matter is frozen and upon thawing is no longer in a firm state.

25. The marine crustacean trap of claim 23, wherein the matter dissolves in water.

* * * * *